United States Patent [19]

Perrotta et al.

[11] Patent Number: 4,818,729

[45] Date of Patent: Apr. 4, 1989

[54] PROCESS FOR PREPARING STABILIZED HIGH CRISTOBALITE

[75] Inventors: Anthony J. Perrotta, Monroeville; Donald K. Grubbs, Rector; Edward S. Martin, New Kensington, all of Pa.

[73] Assignee: Aluminum Company of America, Pittsburgh, Pa.

[21] Appl. No.: 106,815

[22] Filed: Oct. 13, 1987

[51] Int. Cl.$^4$ .............................................. C03C 10/14
[52] U.S. Cl. ........................................ 501/4; 501/133; 501/154; 423/327; 423/329
[58] Field of Search .................. 501/128, 133, 154, 4; 423/327, 329, 328

[56] References Cited

U.S. PATENT DOCUMENTS

| | | | |
|---|---|---|---|
| 3,445,252 | 5/1969 | MacDowell | 501/4 X |
| 3,700,471 | 10/1972 | Duke | 501/4 X |
| 4,050,946 | 9/1977 | Li | 501/4 X |
| 4,073,655 | 2/1978 | Li | 501/4 X |
| 4,395,388 | 7/1983 | Kaduk | 501/4 X |

FOREIGN PATENT DOCUMENTS

| | | | |
|---|---|---|---|
| 0724472 | 3/1980 | U.S.S.R. | 501/4 |
| 0863776 | 3/1961 | United Kingdom | 501/4 |

*Primary Examiner*—William R. Dixon, Jr.
*Assistant Examiner*—James M. Hunter, Jr.
*Attorney, Agent, or Firm*—Glenn E. Klepac

[57] ABSTRACT

A process for preparing a stabilized high cristobalite from a gel comprising ultramicroscopic particles of $SiO_2$, $Na_2O$, and $Al_2O_3$ where the ratio of moles of $Na_2O$ to $Al_2O_3$ is from about 0.95 to about 1.1, and the molar ratio of $SiO_2$ to $Al_2O_3$ is between about 10 and about 40. After the gel is formed, it is heated at 800–1400° C. for a time sufficient to form stabilized high cristobalite.

12 Claims, No Drawings

PROCESS FOR PREPARING STABILIZED HIGH CRISTOBALITE

TECHNICAL FIELD

This invention relates to a process for preparing high cristobalite which does not revert to the low form at any temperature. It is thus useful for preparing ceramics such as refractory fibers, radomes and refractory linings.

BACKGROUND OF THE INVENTION

Crystalline silica is found in nature in three distinct structures, i.e., quartz, tridymite and cristobalite, as identified by x-ray diffraction analysis with each crystalline structure having polymorphic forms stable in different temperature ranges. In each such crystalline form of silica a silicon atom is bonded to four oxygen atoms in tetrahedral coordination. Each form represents a distinct arrangement of silicon-oxygen tetrahedra into a three-dimensional crystalline network. Generally, crystallization temperature determines which structure is formed. Quartz is formed by crystallizing silica at below about 867° C.; tridymite is formed at crystallization temperature of about 867° C. to about 1470° C.; and cristobalite is formed at temperatures above about 1470° C. Cristobalite exists in two polymorphic forms, i.e., low cristobalite, also referred to as alpha cristobalite, and high cristobalite, also referred to as beta cristobalite. High cristobalite, the stable form of crystalline silica at temperatures above about 1470° C., ordinarily converts to low cristobalite when cooled through the temperature range of about 200°-275° C.

High cristobalite is one of the best refractories available for use in ovens and furnaces where the temperatures encountered are well above 1,000° C. and up to 1,450° C., due to its low coefficient of thermal expansion.

Silica brick is the refractory commercially available and it usually contains a mixture of low cristobalite, other low temperature forms of $SiO_2$ including quartz and tridymite, residual glass and some anorthite. When the silica brick refractory is in place as a lining material for a furnace, and is subjected to temperatures up to 1,500° C., substantially all of the other forms of silica are converted over a period of time to the high cristobalite phase. However, when the furnace is shut down for repairs or other reasons and the high cristobalite-containing silica brick is cooled to ambient temperatures, an inversion of the high cristobalite to low cristobalite occurs when the brick is cooled below 200°-275° C. This inversion to low cristobalite produces a change in the volume and symmetry of the high cristobalite, which change results in spalling and cracking of the silica brick, rendering it unusable as a furnace lining. Such bricks must be replaced before the furnace can be fired up again.

The inversion of high cristobalite to the low form upon cooling to below about 200° C. is recognized in U.S. Pat. No. 4,073,655.

Disclosed therein is the teaching that CaO is essential to produce a stabilized high cristobalite from the devitrification of a glass.

DISCLOSURE OF INVENTION

It has now been discovered that a stabilized high cristobalite can be formed by the use of reactive ingredients such as gels at ambient temperature. The process comprises forming a gel comprising ultramicroscopic particles of $SiO_2$, $Na_2O$, and $Al_2O_3$ where the ratio of moles of $Na_2O$ to $Al_2O_3$ is from about 0.95 to about 1.1, and the molar ratio of $SiO_2$ to $Al_2O_3$ is between about 10 and about 40, and heating the gel for a time and temperature sufficient to form stabilized high cristobalite. The molar ratio of $SiO_2$ to $Al_2O_3$ is preferably between about 10 and about 20.

MODES FOR CARRYING OUT THE INVENTION

Suitable $SiO_2$ sources include colloidal silica and sodium silicate solutions. $Na_2O$ is typically supplied as sodium aluminate hydrate, sodium hydroxide or sodium silicate. $Al_2O_3$ can be supplied as sodium aluminate hydrate, aluminum nitrate hydrate and other water soluble aluminum salts. Such water-soluble salts include the nitrates, acetates, formates, and chlorides of aluminum. Other large monovalent cations can be substituted for $Na_2O$ such as $K_2O$, $Rb_2O$ and $Cs_2O$ and supplied as soluble salts such as nitrates, acetates, formates, citrates or chlorides for good solubility. In addition, large divalent cations such as CaO, SrO and BaO can be substituted for monovalent cations.

With both monovalent and divalent cations, equimolar ratios of $Al_2O_3$ must be present to maintain the charge balance in the high (beta) cristobalite lattice. When monovalent ions are used to produce a gel, two moles of the monovalent ion and one mole of $Al_2O_3$ substitute for two moles of $SiO_2$ in the high cristobalite lattice. When divalent cations are used to form the gel, one mole of the divalent ion and one mole of $Al_2O_3$ substitute for two moles of $SiO_2$ cristobalite.

The gels formed by addition of monovalent or divalent cations, $Al_2O_3$ and $SiO_2$ precursors can be heat treated, e.g., 800°-1400° C. to crystallize stabilized high cristobalite or spun into fibers and subsequently heat treated to crystallize stabilized high cristobalite in a continuous filament form.

The following non-limiting examples are preferred embodiments of the invention. All parts and percentages are by weight unless otherwise indicated.

EXAMPLE 1

To aqueous solutions of colloidal $SiO_2$ (Du Pont Ludox AS) were slowly added sodium aluminate solutions to prepare gels. $Na_2O.Al_2O_3.3H_2O$ was dissolved in deionized water to prepare a dilute solution (100 grams per liter). Appropriate amounts of Du Pont Ludox AS solutions were added to dilute sodium aluminate solutions to make gels with $Na_2O:Al_2O_3:nSiO_2$ molar ratios where n equals 12, 13 and 14. A white gel was formed upon addition of the sodium aluminate solutions to the beaker containing the Ludox AS solutions. The gels were stirred for 20 minutes to insure thorough mixing. The gels were evaporated to dryness in a vacuum oven. The dry gels were calcined in platinum crucibles for 24 hours at 1200° C. X-ray diffraction analysis of the samples showed that high (beta) cristobalite was the only crystalline phase present. The samples contained minor to trace amounts of glass.

EXAMPLE 2

Gels were prepared from mixtures of calcium nitrates and aluminum nitrates with colloidal $SiO_2$ solutions (Ludox AS). Appropriate amounts of $Ca(NO_3)_2.4H_2O$ and $Al(NO_3)_3.9H_2O$ were dissolved in deionized water to make an equimolar solution of CaO and $Al_2O_3$. To these solutions were slowly added the appropriate amount of Ludox AS solution to produce gels with varying CaO:$Al_2O_3$:$nSiO_2$ molar ratios where n equals 10, 15, 20, 25, 30, 35, 40. The gels were vigorously agitated for 20 minutes with a magnetic stirrer to insure thorough mixing. The gels were dried at 125° C in a vacuum oven for 24 hours. Samples were calcined at 1000° to 1400° C. for 24 hours. X-ray diffraction analysis showed that beta cristobalite was the major constituent and a trace of anorthite and/or alpha cristobalite was present.

What is claimed is:

1. A process for preparing a stabilized high cristobalite comprising the steps of:
   (a) forming a gel comprising ultramicroscopic particles of:
      (1) $SiO_2$;
      (2) $Al_2O_3$ wherein the molar ratio of $SiO_2$ to $Al_2O_3$ is about 10 to 40; and
      (3) a group 1A metal oxide selected from the group consisting of $Na_2O$, $K_2O$, $Rb_2O$, and $Cs_2O$, or a group 2A metal oxide selected from the group consisting of CaO, SrO, and BaO, wherein the molar ratio of said group 1A or 2A metal oxide to $Al_2O_3$ is about 0.95 to 1.1; and
   (b) heating the gel at 800°–1400° C. for a time sufficient to form stabilized cristobalite.

2. A process as claimed in claim 1 wherein the $SiO_2$ is supplied from the group consisting of colloidal silica and sodium silicate solution.

3. A process as claimed in claim 1 wherein the $Al_2O_3$ is supplied from the group consisting of sodium aluminate hydrate and aluminum nitrate hydrate.

4. A process as claimed in claim 1 wherein the group 1A metal oxide comprises $Na_2O$ supplied from the group consisting of sodium aluminate hydrate, sodium silicate, and sodium hydroxide.

5. A process as claimed in claim 1 wherein the gel is formed from ultramicroscopic particles comprising $SiO_2$, $Al_2O_3$, and $Na_2O$.

6. A process as claimed in claim 1 wherein the gel is formed from ultramicroscopic particles comprising $SiO_2$, $Al_2O_3$, and CaO.

7. A process as claimed in claim 1 wherein step (b) comprises heating the gel at 1000–1400° C.

8. A process as claimed in claim 1 wherein step (b) comprises heating the gel at 1200° C for 24 hours.

9. A process as claimed in claim 1 wherein the molar ratio of $SiO_2$ to $Al_2O_3$ is about 10 to 20.

10. A process as claimed in claim 9 wherein the group 1A metal oxide is $Na_2O$.

11. A process as claimed in claim 1 further comprising:
    (c) spinning the gel into a fiber after step (a) and before step (b).

12. A stabilized high cristobalite fiber made by the process of claim 1.

* * * * *

UNITED STATES PATENT AND TRADEMARK OFFICE
CERTIFICATE OF CORRECTION

PATENT NO.  : 4,818,729

DATED       : April 4, 1989

INVENTOR(S) : Anthony J. Perrotta; Donald K. Grubbs;
              Edward S. Martin It is certified that error appears in the above-identified patent and that said Letters Patent is hereby corrected as shown below:

Col. 2, line 48    Change "$Na_2O.Al_2O_3.3H_2O$" to --$Na_2O \cdot Al_2O_3 \cdot 3H_2O$--.

Col. 2, line 67    Change "$Ca(NO_3)2.4H_2O$" to --$Ca(NO_3)2 \cdot 4H_2O$--.

Col. 2, line 68    Change "$Al(NO_3)3,9H_2O$" to --$Al(NO_3)3 \cdot 9H_2O$--.

Claim 12,
Col. 4, line 30    Change "1" to --11--.

Signed and Sealed this

Seventeenth Day of October, 1989

Attest:

DONALD J. QUIGG

Attesting Officer    Commissioner of Patents and Trademarks